April 3, 1956
O. M. STALKUP
2,740,262
FLOW ATTACHMENT FOR SOFT CREAM FREEZERS
Filed Feb. 9, 1953
2 Sheets-Sheet 1
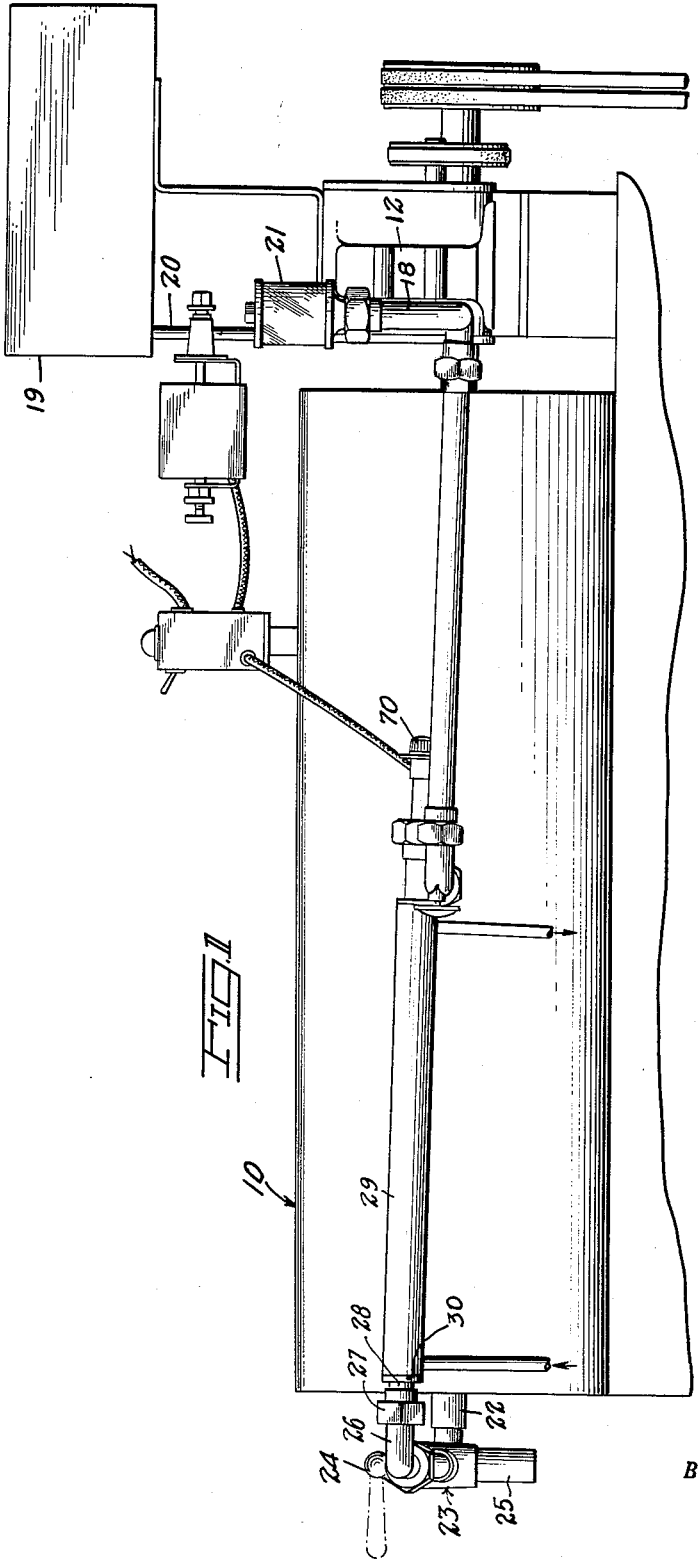
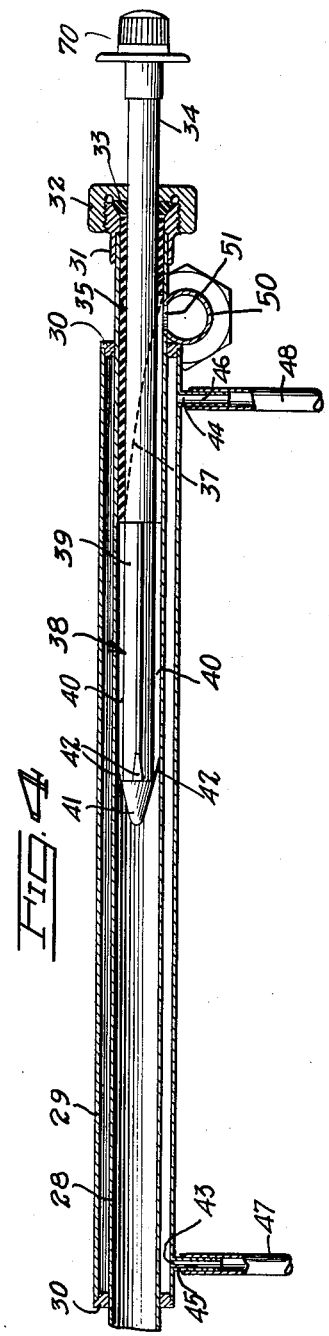
INVENTOR.
OTIS M. STALKUP
BY
ATTORNEYS

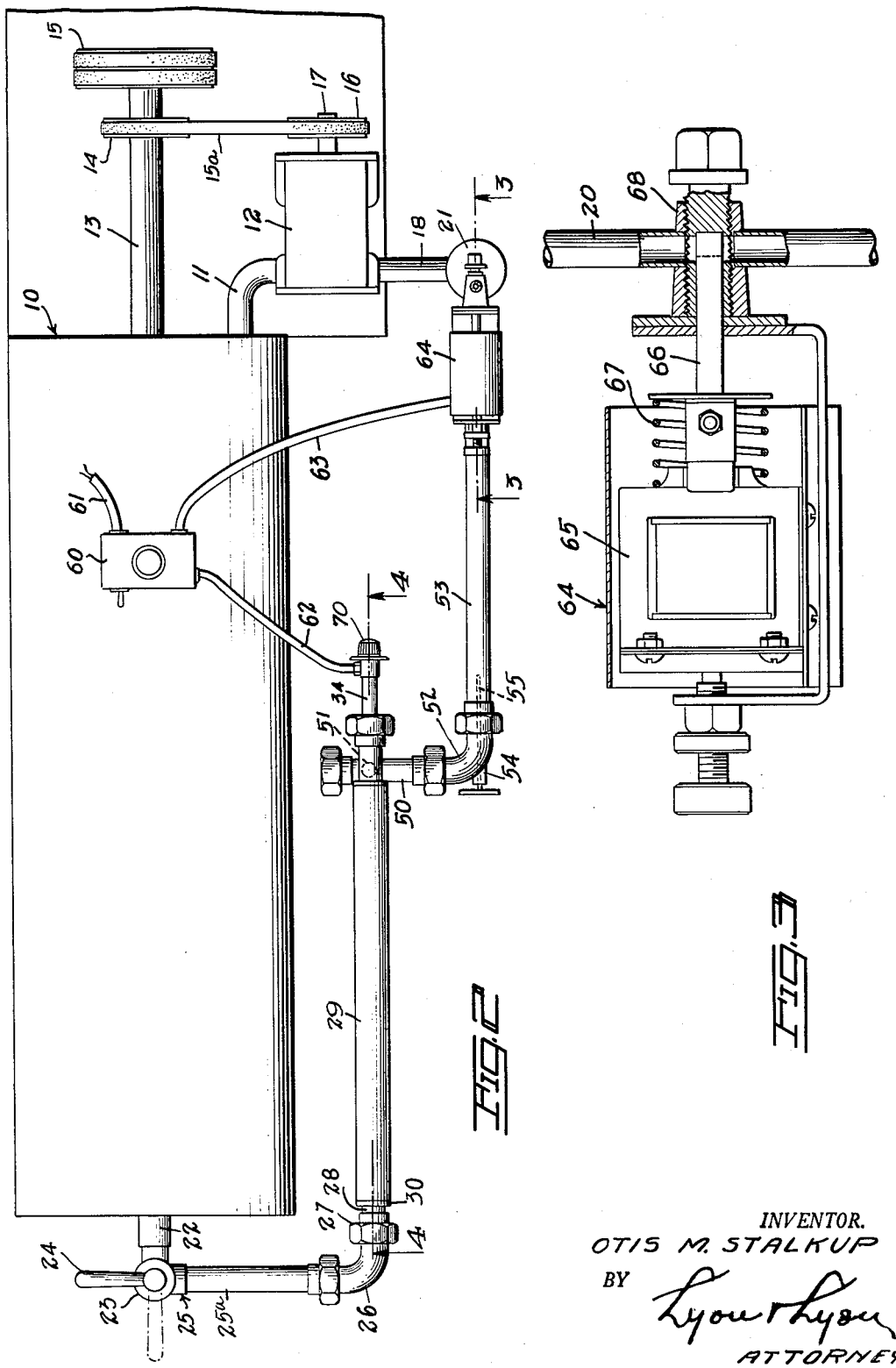

United States Patent Office 2,740,262
Patented Apr. 3, 1956

2,740,262

FLOW ATTACHMENT FOR SOFT CREAM FREEZERS

Otis M. Stalkup, Redondo Beach, Calif.

Application February 9, 1953, Serial No. 335,716

7 Claims. (Cl. 62—2)

This invention relates to a flow attachment for soft cream freezers and the like and more particularly to a device for attachment to a cylinder type freezer and conveyor in which soft cream or soft mix is continuously or intermittently fed to a cylindrical chamber wherein said mix is frozen and driven towards an outlet head by a power driven auger or beater.

In devices of this type, it has been discovered that when any appreciable interval of time is allowed to transpire between occasions for drawing off the product such as ice cream or ice milk, the product adjacent the outlet end of the cylinder becomes hard packed and loses its over-run.

It is accordingly one object of this invention to provide means for attachment to such a freezing unit which eliminates the difficulty at the outlet end of the freezer above described.

It is a further object of this invention to provide means which assure in such a freezer the maintenance of proper over-run.

It has been discovered that in machines of the type described, it is necessary to maintain a certain minimum amount of mix present in the freezing chamber at all times, and it is accordingly another object of this invention to provide means which assure the maintenance of the optimum amount of mix in the freezing chamber.

It is another object of this invention to render the product dispensed by such a freezing unit more homogeneous and constant both as to temperature consistency and over-run.

It is a further object of this invention to eliminate the necessity of the operators of freezers of the type described for drawing off and wasting portions of the mix at frequent intervals.

It is a further object of this invention to provide automatic means for charging additional mix to the freezing cylinder as required.

It is a further object of this invention to provide an automatic mechanism for regulating and maintaining the desired temperature of the mix in the freezer.

It is a feature of this invention that it utilizes a phenomenon depending upon the consistency of the mix in the freezing chamber for regulating not only the supply of fresh mix to the freezing chamber but thereby temperature over-run and consistency of the mix as a whole. As the resistance of the mix to travel through the tubes involved varies in accordance with the temperature of the mix flowing more freely at higher temperatures, an increased temperature of the mix results in a faster flow of mix through the tubes. This, however, rather than resulting in a higher temperature in the tubes causes a lower temperature therein by reason of the fact that an increased amount of the cold mix passes therethrough. Further an increased temperature of the mix in the cylinder is indicative of an over-supply of mix while a decreased temperature of the mix in the cylinder is indicative of the necessity of adding additional mix thereto. This phenomenon is utilized by inserting in the tubes a thermostatic switch set to open on a predetermined drop in temperature in the tubes and to close upon a predetermined rise in temperature therein. The closing of the switch is in turn utilized to activate a solenoid valve and to open the same to permit the discharge of additional mix to the cylinder thus supplying the required amount of additional mix when needed.

It is a further feature of this invention that as a result of the phenomenon above described, cold mix is constantly or intermittently circulated through the cylinder, through the tubes, the pump and back to the cylinder with the result that not only the cylinder but the tubes and pump are maintained at a low temperature thus increasing the life thereof and the sanitary conditions of the mechanism as a whole.

It has been found that with a device of this invention, it is possible to maintain the entire unit and the temperature of the mix at a temperature slightly above that required when the attachment of this invention is not utilized. This is a desirable feature in that such slight increase in temperature is accompanied by a noticeable improvement in the taste qualities of the product.

These and other objects, features and advantages of the present invention will be apparent from the annexed specification in which:

Figure 1 is a side view of a freezer embodying the present invention.

Figure 2 is a plan view.

Figure 3 is a section taken along the line 3—3 of Figure 2.

Figure 4 is an enlarged section taken along the line 4—4 of Figure 2.

Referring now more particularly to the drawings, there is shown a cylinder 10 of the conventional type. This cylinder is conventionally jacketed with cooling elements in good thermal relationship thereto and is provided internally thereof with conveyor means either in the form of an auger or in the form of beaters for driving the mix which is charged to the cylinder towards the outlet end.

In this regard, the cylinder 10 is provided with an inlet 11 in the form of a pipe attached thereto, which pipe is in communication with a pump 12.

The auger or beaters in the cylinder 10 are mounted upon a centrally disposed shaft 13. The shaft 13 as shown is provided with a pair of pulleys 15 for attachment to a drive belt although it will be understood by those skilled in the art that any suitable driven mechanism for the shaft 13 may be employed. As indicated, the shaft 13 may also mount a pulley 14, which by means of a belt 15a and a pulley 16 mounted on a shaft 17 may be utilized to drive the pump 12.

The pump 12 is attached to a pipe 18 which is adapted to feed mix to the pump 12 for charging to the cylinder 10. A hopper 19 is generally provided filled with mix and a tube 20 is attached to the bottom of the hopper 19 and places the hopper 19 in communication with a sight glass 21. The pipe 18 is attached to the bottom of the sight glass 21 and places the same in communication with the pump 12.

Attached to the front of the cylinder 10 is a fitting 22 which is attached to a valve 23. The valve 23 is provided with an operating handle 24 by means of which the operator can dispense the frozen mix to the spiggot 25 in one position the operating handle 24. In another position of the operating handle 24, the valve 23 is adapted to close communication with the fitting 22. In still a third position of the operating handle 24, the valve 23 is adapted to open communication with a tube 25a attached thereto and by-pass the frozen mix discharged through the fitting 22 to the tube 25a. The tube 25a is connected to an elbow 26. The elbow 26 has connected thereto a threaded grommet 27 to which is connected a tube 28. The tube 28 is preferably of one inch diameter and is jacketed by an outer tube 29 of one and one-half inch diameter connected to the tube 28 by a spacer ring 30 at each end thereof. The tube 28 passes beyond the rearward end of the tube 29 as shown in Figure 4 and at its rearward end is provided with a threaded grommet 31 receiving a cap 32 and a neoprene tapered seal 33 by means through which a thermostatic switch 34 is inserted within the tube 28. The thermostatic switch is tubular in form and is provided with a rubber sleeve 35. The rubber sleeve 35 entirely surrounds the thermostatic switch 34 at its rearward end but is cut away on a diagonal as shown at 37 so as to leave the forward under-portion of the thermostatic switch exposed to the interior of the tube 28 but to leave the upper portion of the thermostatic switch insulated by the rubber sleeve 35.

Also within the tube 28 and extending generally forwardly from the end of the thermostatic switch 34 is a dispersal unit 38. This dispersal unit is preferably formed of a hard neoprene and is in the form of a cylinder 39 having diametrically opposed fins 40 in contact with the interior of the tube 28 and serving to space the cylinder 39 therefrom. The forward end of the dispersal unit 38 is tapered as at 41, as are the forward ends of the fins 40 as shown at 42.

The tube 29 is bored as at 43 and 44 to receive tubes 45 and 46 to which are attached sections of rubber tubing 47 and 48. The tube 48 is an inlet tube by means of which hot water is supplied to the annulus between the tubes 28 and 29, which hot water is circulated therethrough and out through the tubes 47. The hot water which is thus supplied to the tube 48 and the annulus between the tubes 28 and 29 is, in practice, supplied from the discharge tube of the water cooled compressor (not shown) which conventionally forms a portion of the refrigeration unit employed with this invention. Such compressors are designed to and deliver water at a uniform temperature. Such compressor forms no part of the present invention and any suitable source of hot water of a uniform temperature can be substituted.

A tube 50 is provided underlying the tube 28 and connected thereto by openings cut in the tube 28 and the tube 50 as indicated at 51. The tube 50 is connected to an elbow 52 which is in turn connected to a tube 53 which connects to the pipe 18. The elbow 52 is provided with a boss 54 drilled to permit the insertion of a thermometer 55 as indicated.

A junction box 60 is provided having an electrical conduit 61 for leading to a suitable source of electrical power. A two lead conduit 62 leads from the junction box 60 to the thermostatic switch 34 and a second two lead conduit 63 leads from the junction box 60 to a solenoid valve 64. The solenoid valve 64 is shown in detail in Figure 3 and comprises a solenoid 65 adapted to attract a shaft 66 on energizing thereof. The shaft 66 is thus connected to the armature of the solenoid and is returned when the solenoid is de-energized by a coil spring 67.

The free end of the shaft 66 is utilized as the plug element of a plug valve 68, which plug valve 68 is inserted in the tube 20 and thus regulates the feed of mix from the hopper 19 to the sight valve 21 and thence to the pump 12.

In practice the tube 53 as well as the tube 50 is placed at a gradual incline so that there will be a gravity feed from the tube 50 and tube 53 to the pipe 18.

The operation of the above described device is as follows: Mix dispersed from the hopper 19 through the tube 20 and by the valve 68 through the sight glass 21, the pipe 18 to the pump 12 and through the pipe 11 to the cylinder 10 is received within the cylinder 10 and driven therethrough by the conveyor means. The conveyor means as above described may conveniently take the form of a beater or auger which may continuously drive the mix through the cylinder 10 wherein the mix is frozen to the desired degree. Air under pressure for supplying the necessary overrun is also conventionally supplied continuously to the cylinder 10, which air pressure assists in driving the mix forwardly in the cylinder. The mix thus driven through the cylinder 10 is driven forwardly in the cylinder (to the left as shown in Figures 1 and 2) to the vicinity of the fitting 22 from which it may be discharged by the valve 23 to the spiggot 25 and served to a customer. However, if it is so desired, the valve 23 may be placed in a position to close the fitting 22 and prevent circulation and dispensing of mix.

In the third setting of the valve 23, communication is open from the fitting 22 to the pipe 25a. Mix thus discharged from the cylinder to the pipe 25a will pass through the tube 28. Water circulated to the annulus between the tube 28 and the tube 29 will heat the mix thus passing through the tube 28 and return the same to the desired consistency. The mix thus passing through the tube 28 will be heated to a semi-liquid state in the neighborhood of 30 to 40° F.

The mix thus passing through the tube 28 contacts the dispersal unit 38 which assures that all of the mix passing beyond the dispersal unit will be in the annular space between the bottom of the thermostatic switch 34 and the tube 28. The mix will pass from the tube 28 through the opening 51 into the tube 50 from which it is conveyed through the elbow 52 and tube 53 to the pipe 18.

The thermostatic switch 34 is provided with an adjustment knob 70 to regulate the temperature at which said thermostatic switch will make or break contact and thus regulate the temperature at which the solenoid valve 64 will be actuated.

Mix thus discharged from the discharge end of the cylinder 10 is conditioned in the tube 28 and returned through the pipe 18 to the pump 12 and to the inlet end of the cylinder. By thus continuously or intermittently recirculating the mix, the same is prevented from being compacted at the discharge end of the cylinder 10 and the difficulty previously encountered of having the product thus compacted and deprived of its over-run is avoided.

By reason of the thermostatic control of the solenoid valve 64, additional mix is supplied to the cylinder 10 under regulated conditions. It will be appreciated that when frozen material is being discharged and circulated through the tube 28 that this material will be driven under the force of the conveyor and the air pressure conventionally present in the cylinder 10 through the tube 28 at a rate dependent upon the consistency of the mix. This consistency will vary in accordance with the temperature thereof and should the temperature thereof drop, the rate of travel of the mix through the pipe 28 will decelerate. Should such a condition exist, the rate of the arrival of cool material at the region of the thermostatic switch 34 will decrease with the resultant increase in temperature at this point. Conversely, should the temperture of the mix raise, the mix will be driven through the pipe 28 at a greater rate and thus the rate of the arrival of cool material in the region of the thermostatic switch 34 will increase with a resultant decrease in temperature at this point. This phenomenon is utilized to alternately open and close the solenoid valve 64 to allow make-up mix from the hopper 19 to be fed to the cylinder 10. In this regard, the thermostatic switch 34 is adjusted to close upon a predetermined rise in temperature and thus actuate the solenoid valve 64 and feed mix to the cylinder 10. Equally, the thermostatic switch 34 is set to open upon a predetermined drop in temperature and thus to de-energize the solenoid valve 64 and discontinue the feeding of make-up mix to the cylinder 10. It has been found in practice that the addition of a very small amount of additional mix to the cylinder 10 will have a marked effect upon the consistency of the entire mass of mix present in the cylinder. Such a thinning of the mixture will cause a marked acceleration of the circulation of the mix to the tube 28 which will cause a rapid cooling in the region of the thermostatic switch 34 with the result that the switch can be set to operate within very narrow limits and to control the temperature and consistency of the mix in the cylinder 10 between very narrow limits. By this means, the consistency and the temperature of the mix in the cylinder 10 may thus at all times be maintained in the desired condition.

From the foregoing description, it will be apparent that by means of the device above described, a continuous circulation of the mix in the cylinder can be provided and the difficulties which it is the object of this invention to overcome are obviated.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:

1. A flow attachment for soft mix freezers of the type wherein refrigerated mix is extruded from a cylinder comprising: means for drawing off mix from the discharge end of said cylinder; means for conveying said drawn off mix to the inlet end of said cylinder; means for supplying heat to said drawn off mix during its passage toward said inlet end; means for supplying additional mix to said inlet end including a valve for opening or closing the same; and means responsive to a change in temperature of said drawn off mix for opening or closing said valve; said last mentioned means comprising a thermostatic switch located adjacent said heat supplying means and operative upon an increase in temperature thereof to open said valve.

2. A flow attachment for soft mix freezers of the type wherein refrigerated mix is extruded from a cylinder comprising: means for drawing off mix from the discharge end of said cylinder; means for conveying said drawn off mix to the inlet end of said cylinder; means for supplying heat to said drawn off mix during its passage toward said inlet end; means for supplying additional mix to said inlet end including a valve for opening or closing the same; and means responsive to a change in temperature of said drawn off mix for opening or closing said valve; said last mentioned means comprising a thermostatic switch located adjacent said heat supplying means and operative upon an increase in temperature thereof to open said valve and to close said valve on a corresponding decrease in temperature.

3. A flow attachment for soft mix freezers of the type wherein refrigerated mix is extruded from a cylinder comprising: an outlet at the discharge end of said cylinder; a valve affixed to said outlet and having a closed position, a dispensing position and a position for recirculating drawn off mix; a tube connected to the recirculating port of said valve for conveying said drawn off mix to the inlet end of said cylinder; means for supplying heat to said drawn off mix during its passage toward said inlet end; means for supplying additional mix to said inlet end including a valve for opening or closing the same; and means responsive to a change in temperature of said drawn off mix for opening or closing said valve; said last mentioned means comprising a thermostatic switch located adjacent said heat supplying means and operative upon an increase in temperature thereof to open said valve.

4. A flow attachment for soft mix freezers of the type wherein refrigerated mix is extruded from a cylinder comprising: an outlet at the discharge end of said cylinder; a valve affixed to said outlet and having a closed position, a dispensing position and a position for recirculating drawn off mix; a tube connected to the recirculating port of said valve for conveying said drawn off mix to the inlet end of said cylinder; means for supplying heat to said drawn off mix during its passage toward said inlet end; means for supplying additional mix to said inlet end including a valve for opening or closing the same; and means responsive to a change in temperature of said drawn off mix for opening or closing said valve; said last mentioned means comprising a thermostatic switch located adjacent said heat supplying means and operative upon an increase in temperature thereof to open said valve and to close said valve on a corresponding decrease in temperature.

5. A flow attachment for soft mix freezers of the type wherein refrigerated mix is extruded from a cylinder comprising: an outlet at the discharge end of said cylinder; a valve affixed to said outlet and having a closed position, a dispensing position and a position for recirculating drawn off mix; a tube connected to the recirculating port of said valve for conveying said drawn off mix to the inlet end of said cylinder; means for supplying heat to said drawn off mix during its passage toward said inlet end; means for supplying additional mix to said inlet end including a solenoid actuated valve for opening or closing the same and means responsive to a change in temperature of said drawn off mix for opening or closing said valve; said last mentioned means comprising a thermostatic switch located adjacent said heat supplying means and operative upon an increase in temperature thereof to open said valve.

6. A flow attachment for soft mix freezers of the type wherein refrigerated mix is extruded from a cylinder comprising: an outlet at the discharge end of said cylinder; a valve affixed to said outlet and having a closed position, a dispensing position and a position for recirculating drawn off mix; a tube connected to the recirculating port of said valve for conveying said drawn off mix to the inlet end of said cylinder; means for supplying heat to said drawn off mix during its passage toward said inlet end; means for supplying additional mix to said inlet end including a solenoid actuated valve for opening or closing the same and means responsive to a change in temperature of said drawn off mix for opening or closing said valve; said last mentioned means comprising a thermostatic switch located adjacent said heat supplying means and operative upon an increase in temperature thereof to open said valve and to close said valve on a corresponding decrease in temperature.

7. A flow attachment for soft mix freezers of the type wherein refrigerated mix is extruded from a cylinder comprising: an outlet at the discharge end of said cylinder; a valve affixed to said outlet and having a closed position, a dispensing position and a position for recirculating drawn off mix; a tube connected to the recirculating port of said valve for conveying said drawn off mix to the inlet end of said cylinder; means for supplying heat to said drawn off mix during its passage toward said inlet end comprising a jacket covering a portion of said tube and means for supplying hot water to said jacket; means for supplying additional mix to said inlet end including a solenoid actuated valve for opening or closing the same and means responsive to a change in temperature of said drawn off mix for opening or closing said valve; said last mentioned means comprising a thermostatic switch located adjacent said heat supplying means and operative upon an increase in temperature thereof to open said valve and to close said valve on a corresponding decrease in temperature.

References Cited in the file of this patent

UNITED STATES PATENTS

| | | |
|---|---|---|
| 1,783,867 | Vogt | Dec. 2, 1930 |
| 1,874,718 | Tyson | Aug. 30, 1932 |
| 2,001,344 | Fielder | May 14, 1935 |
| 2,020,946 | Jordan | Nov. 12, 1935 |
| 2,210,366 | Godfrey | Aug. 6, 1940 |
| 2,274,220 | Sticelber | Feb. 24, 1942 |
| 2,522,648 | Tachella | Sept. 19, 1950 |
| 2,687,019 | Swenson | Aug. 24, 1954 |

FOREIGN PATENTS

| | | |
|---|---|---|
| 47,722 | Denmark | Sept. 4, 1933 |